Jan. 30, 1962

P. MESHBERG 3,018,928

METERING VALVE

Filed Nov. 24, 1958

INVENTOR.
Philip Meshberg
BY
Johnson and Kline
ATTORNEYS

United States Patent Office 3,018,928
Patented Jan. 30, 1962

3,018,928
METERING VALVE
Philip Meshberg, 290 Euclid Ave., Fairfield, Conn.
Filed Nov. 24, 1958, Ser. No. 775,827
21 Claims. (Cl. 222—335)

This invention relates to valves for dispensing a predetermined quantity of material from a container under pressure. More specifically, it pertains to metering valves for dispensing a material under pressure of immiscible gas in the container.

In the field of pressure charged material dispensing devices and the like, it is commonly the practice to utilize miscible gases such as "Freon," to force the material being dispensed through the valve and outwardly of the container. With certain materials, however, it is undesirable to mix the gas with the material and in these instances immiscible gases, such as nitrogen, are relied upon to provide the impelling force to drive the material from the container.

Recently, valves have been developed for dispensing metered or predetermined dosages of material. These valves normally comprise a valve housing, having an inlet port for connecting the housing to a container, adapted to hold a predetermined quantity of the material and valving means for communicating the housing to the atmosphere and simultaneously closing the housing to the container. Metering valves of the type above described, have proved highly satisfactory when utilized to dispense materials under pressure of a miscible gas, since the material and the gas enter the valve housing together and the mixture is self-propelling when the housing is communicated with the atmosphere. With immiscible gases, however, a serious problem is presented which has not been solved prior to this invention. A material under pressure of an immiscible gas in the container is forced into the valve housing alone and, when the housing is valved-off from the container to confine a predetermined dosage, is without means for dispelling it therefrom.

The instant invention overcomes the problem aforenoted and has as a basic object, the provision of a metering valve adapted for use in dispensing a material under pressure of an immiscible gas in the container.

It is also an object of the invention to provide a metering valve including means actuated by a pressure differential between the container and the housing for ejecting the material in the housing outwardly thereof.

It is another object of the invention to provide a metering valve for dispensing materials under pressure of an immiscible gas in said container which includes a valve housing having an inlet port communicating the housing with the container and adapted to hold a predetermined quantity of the material, valving means for communicating the housing with the atmosphere and simultaneously closing off the housing from the container and means for ejecting the material from the housing when the latter is communicated with the atmosphere, the ejecting means being actuated by a pressure differential between the housing and the container.

It is another object of the invention to provide in a metering valve for dispensing a material under pressure of an immiscible gas in the container, means operating in conjunction with material ejecting means to force air into the stream of material emanating from the valve so that a relatively finely divided spray is provided.

It is further an object of the invention to provide a metering valve for dispensing a material under pressure of an immiscible gas in the container which is completely self-contained and which includes means actuated by a pressure differential between the container and the housing for ejecting the material outwardly of the housing in stream or spray form.

It is still further an object of the invention to provide a metering valve for dispensing a material under pressure of an immiscible gas in the container which is simple in structure, may be readily manufactured by quantity production methods and is of such rugged character it will function over long periods of time, under normal use, with freedom from all difficulties.

Other objects and advantages of the invention will be apparent from the specification and claims when considered in connection with the attached sheets of drawings, illustrating some forms of the invention, wherein like characters represent like parts, and in which:

According to the instant invention, in order to dispense a predetermined quantity of material from a container under pressure of an immiscible gas in the container, a metering valve of the type including a valve housing having an inlet port for connecting the housing to the container adapted to hold a predetermined quantity of the material and valving means for communicating the housing to the atmosphere and simultaneously closing the housing to the container, is provided with means actuated by a pressure differential between the housing and the container for forcing the material outwardly of the valve housing.

Figure 1:
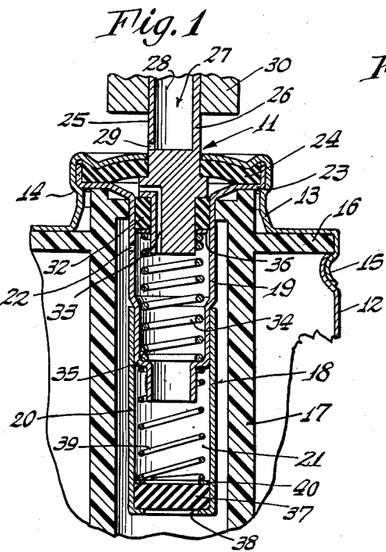
FIGURE 1 is a fragmentary sectional view of a metering valve, according to the invention, mounted in a container for dispensing material under pressure of an immiscible gas in the container.
Figure 2:
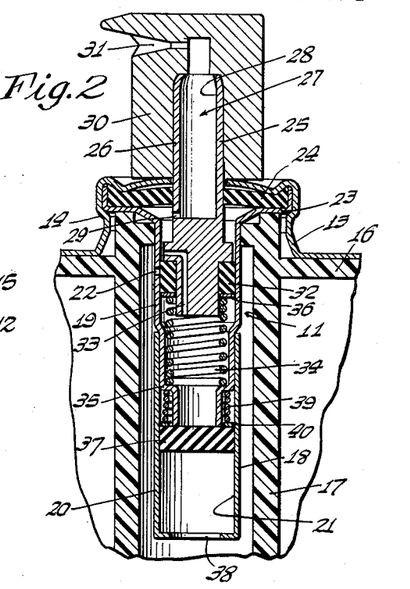
FIG. 2 is a fragmentary view, in section, of the metering valve of FIG. 1 in material dispensing position.

Referring now to the drawings, in FIGS. 1 and 2, a metering valve unit, generally indicated by the numeral 11, is shown mounted on a container 12 for dispensing material under pressure of an immiscible gas, in the container, therefrom. While the valve unit may be mounted on the container 12 in any conventional manner known to the art, in the illustrated form of the invention the valve is secured in a mounting assembly 13 as by crimping at 14 and the assembly with valve mounted therein as thereafter secured to the container by a rolled-in or similar locking arrangement as indicated at 15. The joint between mounting assembly 13 and container 12 is sealed against the escape of gas or the material in the container by means of a seal 16 which, as shown, is formed integral with a conventional dip tube 17. For a more detailed description of the valve mounting and related structure herein illustrated, reference is made to my copending application Serial No. 563,567, filed February 6, 1956, now Patent No. 2,867,358, dated January 6, 1959.

Metering valve unit 11 comprises an elongate substantially tubular valve housing 18 adapted to hold a predetermined quantity or dosage of the material to be dispensed. The valve housing, which may be formed of any desirable material and in any manner commonly known to the art, includes upper and lower portions 19 and 20 respectively, which between them define a material receiving chamber 21 of predetermined capacity. The material receiving chamber 21 is communicated with the interior of container 12 through an inlet port 22 which extends laterally through a side wall of the valve housing. At the upper end of the housing an enlarged shoulder 23 is provided for seating a sealing valve disk 24 which is clamped between the shoulder 23 and the mounting assembly 13 to seal-off chamber 21. A reciprocable valve stem 25 is movably mounted within valve housing 18 and includes an upper stem portion 26 normally projecting outwardly of the housing through a central bore provided in sealing valve disk 24 and mounting assembly 13. The upper portion of valve stem 25, or that portion which normally projects outwardly of the valve housing includes means 27 for communicating the housing with the atmosphere when the stem is displaced, from its normal outwardly projecting position, inwardly of the housing. While the atmosphere communicating means may take a wide variety of forms, in the embodiment of the invention shown in FIGS. 1 and 2 it includes a longitudinally extending bore 28 and a laterally extending orifice 29. A dispensing button 30, including a dispensing passage 31 complementary with the communicating means 27 of the upper stem portion, is frictionally or similarly removably mounted on upper stem portion 26 to facilitate operation of the valve and for other purposes to be hereinafter explained.

Inwardly of valve housing 18, reciprocable valve stem 26 mounts an annular resilient sealing or valving member 32 which functions, when valve stem 25 is displaced from normal position inwardly of the container, to close off inlet port 22 and break communication between chamber 21 of the valve housing and the interior of container 12. A passage 33 is formed in the interiorly disposed portion of the valve stem to circumvent valving member 32 and provide communication between the upper and lower portions of valve housing chamber 21, as defined by valving member 32.

As was noted above, valve stem 25 is normally disposed in its uppermost position with upper valve stem portion 26 projecting outwardly of the housing. This position of the stem is maintained by a resilient means 34, here shown as a coil spring, which has its lowermost end supported on the upper surface of a shoulder 35 provided in the interior of the housing and its uppermost end exerting a pressure on an annular washer 36, or similar means, carried by the stem and abutting valving seal 32.

The valve unit 11, thus far described, is structurally sufficient to function as a metering valve for material under pressure of a miscible gas such as "Freon" but will not serve to dispense a material under pressure of an immiscible gas, such as nitrogen, in the container. It is known that when an immiscible gas is utilized to generate pressure on a material in a container it acts on the upper surface of the material to force the material through a dip tube or similar device and thereafter through the valve and outwardly of the container. As was previously noted, this method of dispensing materials cannot function when the valve is of the metering type, that is of the type which seals-off a predetermined quantity of the material from the container and the pressure generated therein before dispensing it to the atmosphere. In order to overcome this problem and enable immiscible gases to be utilized in conjunction with metering valves, I have provided an ejection means which is actuated by a pressure differential between the chamber in the valve housing and the container for ejecting the material from the housing when the latter is communicated with the atmosphere. In the embodiment of my invention illustrated in FIGS. 1 and 2, the ejection means comprises a resilient disk or washer 37 slidably sealingly housed in chamber 21 and disposed over an opening 38 in the valve housing communicating with the container. A coil spring 39 acts on sealing disk 37 to normally maintain the same in position over opening 38. The spring 39 has its upper end supported against movement by the lower surface of shoulder 35 formed in the housing and its lower end engaging and acting on an annular washer 40 carried by disk 37.

In the operation of metering valve 11, for dispensing a material from a container under pressure of an immiscible gas in the container as above described, the material is forced upwardly through dip tube 17, by the pressure of the immiscible gas on the surface of the material, into chamber 21 in valve housing 18 through inlet port 22. It will be understood that during this step in the operation of the valve, the valve stem will be in its normal position with upper stem portion 26 projecting outwardly of the housing and the ejecting means will likewise be in normal position, both as shown in FIG. 1. After valve housing 18 is filled with a predetermined amount of the material to be dispensed, and it is desired to dispense the same, manual pressure is exerted on dispensing button 30 to displace valve stem 25 axially inwardly of the valve housing, against spring 34. As the valve stem is moved inwardly of housing 18, valving member 32 is disposed over inlet port 22 to valve-off communication between chamber 21 and the interior of container 12. In this manner a predetermined dosage or quantity of the material to be dispensed is defined and the valve is prepared to dispense the same. Further depression of the valve stem causes lateral orifice 29 in upper valve stem portion 26 to pass sealing disk 24 and enter chamber 21. At this point in the operation of the valve, the valve housing is communicated with the atmosphere and the material is enabled to pass outwardly of the valve housing through orifice 29, bore 28 and dispensing passage 31. Substantially simultaneously with the creation of communication between the valve housing and the atmosphere, the pressure in the housing is reduced causing a pressure differential to exist at opening 38, between the housing and container 12. As a result of the pressure differential, the ejection means is actuated and disk 37 is caused to move upwardly in the valve housing against spring 39 by the pressure in the container to force the material in the housing outwardly thereof. It will be understood that the material is permitted to circumvent valving seal 32 by passage 33 formed in the valve stem.

After the predetermined quantity of material has been dispensed from chamber 21, the manual pressure on button 30 is released and the valve stem is returned to normal position, with upper stem portion 26 projecting outwardly of the housing, by the force of spring 34. The return of the valve stem first causes communication between the housing and the atmosphere to be broken by closing off orifice 29 to chamber 21 and thereafter opens communication between the housing and the interior of container 12 by the withdrawal of valving seal 32 from sealing engagement with inlet port 22. Substantially simultaneously with the opening of inlet port 22, the material in the container is again forced up the dip tube and into the housing to equalize the pressure between the latter and the container. After the pressure is equalized, spring 39 of the ejection means forces ejection disk 37 into normal position over opening 38 and the valve is again in condition for another operating cycle.

The metering valve 11, in addition to functioning in a highly desirable manner, is economically manufactured by quantity production methods and is readily adapted to be produced for use with containers of different sizes or to dispense different predetermined quantities of material. It will be understood that in the initial fabrication of valve housing 18 upper and lower housing portions 19 and 20 may be variously telescopically connected to form longer or shorter chambers 21 and that additional reduction in the capacity of the chamber may be achieved by utilizing a lower housing section 20 of shorter length.

The valve herein above-described is likewise adapted for pressure filling, which is a highly desirable feature in devices of this kind. In order to pressure fill container 12, without removing metering valve 11 therefrom, dispensing button 30 is removed from upper stem portion 26 and a pressure filling nozzle (not shown) of any commonly known type, is attached thereto. The valve stem is then depressed against spring 34 so that valving member 32 passes beyond inlet port 22 inwardly of housing 18. In this manner filling communication with the interior of container 12 is provided through bore 28, orifice 29, inlet port 22 and dip tube 17. It will be understood that accidental displacement of valve stem 25, to pressure filling position, is prevented during the normal use of the valve by dispensing button 30 which functions to limit the inward displacement of the valve stem.

With respect to the metering valve described above, and those to follow, it will be readily understood, that material under pressure of miscible gases or mixtures of miscible and immiscible gases may be dispensed in the same manner as material under pressure of immiscible gases alone.

Figure 3:
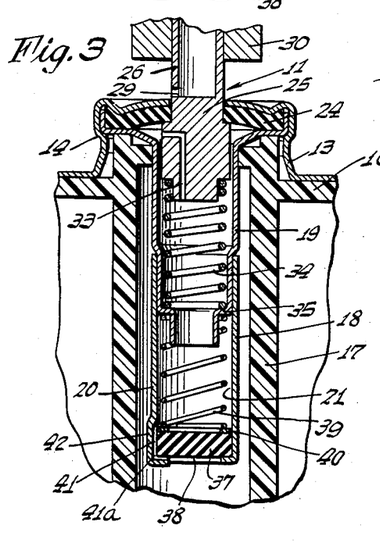
FIG. 3 is a fragmentary sectional view of a metering valve similar to that shown in FIG. 1 but with a modified inlet port and valving structure.
Figure 4:
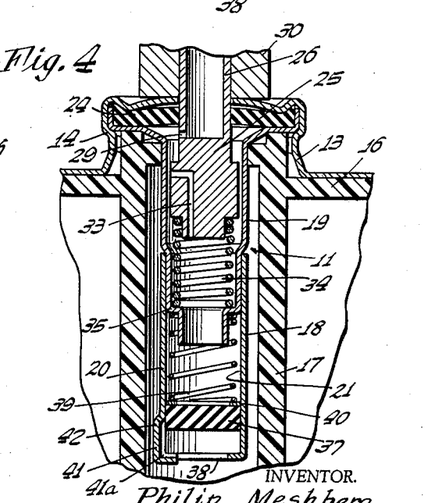
FIG. 4 is a fragmentary sectional view of the metering valve of FIG. 3 in material dispensing position.

In FIGS. 3 and 4 a modified form of the metering valve 11, illustrated in FIGS. 1 and 2, is shown. According to this form of the invention, the inlet port is formed adjacent the movable ejection seal or disk 37 of the ejection means, as indicated at 41. This may be accomplished by providing a bulged portion 42 at the lower end of the valve housing adjacent opening 38 which communicates the housing with the container, the bulged portion forming a passage 41a around seal 37 for the entrance of material into the housing from the container. It will be readily understood, that by eliminating the laterally extending side wall inlet port 22 of FIGS. 1 and 2, that the necessity for mounting a valving seal 32 on the valve stem is made unnecessary.

In the operation of this form of metering valve 11, the valve housing is filled with the material to be dispensed, when the valve parts are in their normal position as indicated in FIG. 3, by the pressure of the immiscible gas on the surface of the material in the container forcing the material upwardly through dip tube 17, and through inlet port 41 into chamber 21. In order to dispense the material from the valve housing in a predetermined quantity, the dispensing button 30, as was described above with respect to FIGS. 1 and 2, is depressed to displace valve stem 25 inwardly of the housing against spring 34. As soon as orifice 29 in upper valve stem portion 26 is disposed in the chamber 21 to communicate the housing with the atmosphere, the pressure in the housing drops and a pressure differential is created at opening 38, between the housing and the container. The pressure differential, as was discused above, displaces ejection seal 37 inwardly of the housing against spring 39 to force the material outwardly of the housing chamber through the outlet means in upper valve stem portion 26. It will be noted, with respect to FIG. 4, that the initial upward ejecting movement of ejection seal 37 valves-off inlet port 41 thereby closing-off the housing from the container and defining a predetermined dosage of the material. In all other respects the valve of FIGS. 3 and 4 is similar to the valve of FIGS. 1 and 2.

Figures 5, 6, 7, 8:
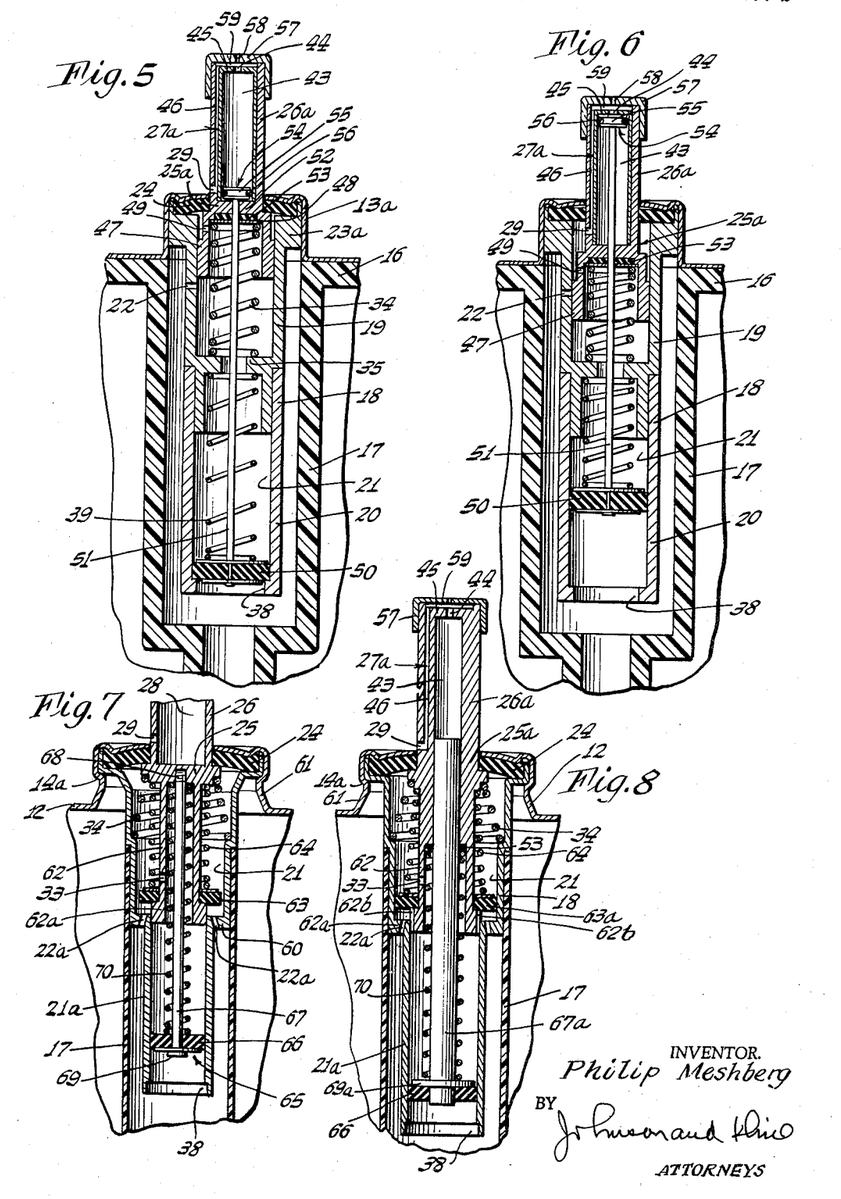
FIG. 5 is a fragmentary sectional view of a metering valve for dispensing a material under pressure of an immiscible gas in the container which includes means for mixing air with the material to form a spray.
FIG. 6 is similar to FIG. 5 but shows the metering valve in material dispensing position.
FIG. 7 is a fragmentary sectional view illustrating an alternative form of metering valve having ejection means for forcing the material out of the valve housing.
FIG. 8 is a fragmentary sectional view showing a modification of the valve of FIG. 7 which includes means for injecting air into the material dispensed from the housing for forming a spray thereof.

Referring now to FIGS. 5 and 6, a metering valve 11 is shown for dispensing a material under pressure of an immiscible gas in the container which includes means for mixing air with the material, as it is forced outwardly of the valve housing by the ejection means, to form a spray thereof. The metering valve, similar to that discussed with respect to FIGS. 1 and 2, includes a valve housing 18 having upper and lower portions 19 and 20 respectively which define between them a metering chamber 21. The valve housing here illustrated is formed with an enlarged shoulder 23a, which is press fit in a mounting assembly 13a, which in turn is connected to a container (not shown) of any type known to the art. A flexible sealing valve disk 24 is disposed between enlarged shoulder 23a and mount 13a for sealing-off valve housing chamber 21. A reciprocable valve stem 25a is movably mounted within valve housing 18 and includes a hollow upper valve stem portion 26a normally projecting outwardly of the housing through a central bore provided in sealing valve disk 24. The upper valve stem portion includes means 27a for communicating the housing with the atmosphere when the stem is displaced, from its normal outwardly projecting position, inwardly of the housing and provides an air chamber 43, for a purpose to be hereinafter explained, opening to the atmosphere through an orifice 44 formed in an end wall 45 thereof. In the form of the invention illustrated in FIGS. 5 and 6 the atmosphere communicating means 27a is shown as including a passage 46 and a laterally extending orifice 29.

Inwardly of valve housing 18 valve stem 25a provides a hollow substantially cylindrical lower portion 47 adapted to slidably sealingly engage the walls of valve chamber 21, so that when the valve stem is displaced from its normal position, lower portion 47 will valve-off an inlet port 22 formed in the side of the valve housing to break communication between the valve chamber and the interior of the container. The valve stem, similar to the valve structures discussed hereinabove, is biased to normal position, with upper stem portion 26a projecting outwardly of the valve housing, by a spring 34 mounted on a shoulder 35 on the interior of the housing and engaging an annular washer 48 seated in hollow lower valve stem portion 47. An opening 49 is formed in the side wall of lower stem portion 47 to permit passage of material between upper and lower portions of valve chamber 21, as defined by the engagement of the surface of the lower stem portion with the interior wall of the chamber.

In order to facilitate the ejection of material from valve housing 18 outwardly thereof, an ejection seal 50 formed of rubber or similar material is sealingly slidably positioned in chamber 21 of the housing and disposed over an opening 38 therein communicating the housing with the interior of the container to which the valve 11 is attached. The ejection seal is adapted to be shifted longitudinally in the housing when a pressure differential exists between the housing and the interior of the container and is maintained in its normal position, as shown in FIG. 5 by a spring 39 or similar resilient means.

It will be readily understood by those familiar with the material dispensing art, that a material which does not contain a miscible gas, when dispensed from a closed chamber will normally be ejected in stream form. It is often desirable to dispense materials such as cosmetics, medicants, deodorants, paints, etc., in spray form and to this end the ejection means hereinabove described is modified to include means for mixing air with the stream of material being dispensed from the housing to form a spray thereof. In FIGS. 5 and 6 the ejection seal 50 is shown as being fixedly carried on a plunger rod 51 which is movably supported for reciprocation by valve stem 25a in the end wall 52 of air chamber 43. An annular seal 53 seated between end wall 52 and annular washer 48 prevents the escape of the material from chamber 21 around the plunger rod into air chamber 43. A plunger 54 is carried by plunger rod 51, inwardly of air chamber 43, and when ejection means 50 and the plunger rod are disposed in normal position, is disposed in the inner end of the air chamber. While plunger 54 may take any convenient form it is herein shown as including a substantially cylindrical body 55 having a circumferentially disposed O-ring 56 mounted thereon to facilitate the slidable sealing reciprocation of the plunger in air chamber 43.

In the operation of metering valve 11 illustrated in FIGS. 5 and 6, the material is forced upwardly through dip tube 17, by the pressure of the immiscible gas on the surface of the material, into chamber 21 in valve housing 18 through inlet port 22. During this step of the operation of the valve, valve stem 25a is in its normal position with upper valve stem portion 26a projecting outwardly of the housing (see FIG. 5). Ejection means 50 with plunger rod 51 and plunger 54 are likewise in normal position. After the valve housing is filled with a predetermined quantity of the material to be dispensed and it is desired to dispense the same, manual pressure is exerted on a dispensing button or similar means (not shown) to displace valve stem 25a axially inwardly of the valve housing against spring 34. As the valve stem is thus displaced, lower valve stem portion 47 is disposed over inlet port 22 to valve-off communication between chamber 21 and the interior of the container. By closing off inlet port 22 a predetermined quantity of the material is defined and the valve is in position to dispense the material on continued inward displacement of the valve stem. The continued displacement of valve stem 25a causes lateral orifice 29 in upper valve stem portion 26a to pass sealing valve disk 24 and enter chamber 21. At this point in the operation of the valve, the valve housing is communicated with the atmosphere and the material is enabled to pass outwardly of the valve housing through orifice 29 and passage 46. Simultaneously with the creation of communication between the valve housing and the atmosphere, the pressure in the housing is reduced causing a pressure differential to exist at opening 38 between the housing and the container. As a result of the pressure differential the ejection means is actuated and ejection seal 50 and plunger rod 51, connected thereto, are caused to move upwardly in the valve housing against spring 39 by the pressure in the container. Similar to the previously described valves, the ejection seal forces the material outwardly of the housing through opening 49 in lower stem portion 47, lateral orifice 29 and passage 46. Simultaneously with the upward movement of ejection seal 50, plunger rod 51 carries plunger 54 toward the outer end of air chamber 43 to force the air therefrom through orifice 44 in end wall 45 to mix with the material and form a spray thereof. In order to facilitate the mixing of the material being dispensed from the valve housing with the air being forced out of air chamber 43, a cap 57 having an opening 58 therein is disposed over the outer end of upper stem portion 26a to substantially enclose the end of communicating means 27a and the orifice leading from air chamber 43 and to provide a passage 59 wherein the air and material are mixed before being dispensed to the atmosphere.

After the predetermined quantity of material has been dispensed from chamber 21 in spray form by mixture with the air emanating from air chamber 43, manual pressure on the valve stem is released and the stem is permitted to return to normal position under the pressure of spring 34. On the return of valve stem 25a to normal position, communication between chamber 21 and the atmosphere is broken by closing off orifice 29 to the chamber and thereafter communication between the chamber and the container is re-established by the withdrawal of lower valve stem portion 47 from engagement with inlet port 22. As the valve housing is again filled with the material to be dispensed, the pressure differential between the housing and the container is eliminated with the result that ejection means 50 and plunger rod 51, carrying plunger 54, return to normal position.

The metering valve of FIGS. 5 and 6 is adapted to be pressure filled in a manner substantially identical with that described in FIGS. 1 and 2 and the valve may likewise be formed with metering chambers of different sizes for the reasons thereabove discussed.

In FIG. 7 another form of metering valve for dispensing material under pressure of an immiscible gas in the container is shown. As illustrated, the valve housing 18 of this metering structure is formed with a laterally extending external shoulder 60 through which is formed a plurality of substantially longitudinally extending inlet ports 22a adapted to communicate metering chamber 21 with the interior of container 12. While the instant metering valve may be utilized with a great variety of material containers and may be mounted thereon in the manner described with respect to FIGS. 1 through 6, in the herein illustrated form of the invention the valve housing is shown to be crimped, as at 14a, directly to a neck 61, formed integral with the container, and sealed by a sealing valve disk 24 therebetween. The dip tube 17 is of the conventional type and is frictionally telescopically connected to valve housing 18. Valve stem 25, which is substantially identical with the valve stem of FIGS. 1 to 4 and is biased by a spring 34 into normal position, includes a hollow substantially cylindrical lower valve stem portion 62 which is adapted to slidably carry, adjacent a shoulder 62a formed at its inner end, an annular resilient valving member 63. The valving member 63, which is normally biased into engagement with shoulder 62a by a spring or similar resilient means 64 is adapted, on valve stem 25 being displaced inwardly of the housing, to close inlet ports 22a thereby valving-off communication between metering chamber 21 and the interior of container 12.

In order to facilitate the ejection of material from chamber 21, an ejection means 65 is provided. In the instant embodiment of the invention the ejection means comprises an annular resilient seal or washer 66 slidably mounted on a headed rod 67 which is connected to valve stem 25, as indicated at 68. The seal, which sealingly slidably engages the inner wall of lower housing chamber portion 21a and is disposed over an opening 38 communicating the chamber with the interior of container 12, is normally resiliently biased into engagement with head 69 of the rod by a spring 70, which engages the seal and seats in the hollow lower end of the valve stem.

In the operation of the valve of FIG. 7, which is substantially the same as in the previously described valves, the inlet ports 22a are valved-off by valving member 63 on the initial depression of valve stem 25 so that communication between chamber 21 and the container is discontinued. Further depression of valve stem 25 to pass orifice 29 inwardly of the valve chamber compresses spring 64 to maintain valving seal 63 in closing engagement with the inlet ports. As with the previously described valves, the pressure in chamber 21 is reduced when orifice 29 communicates the chamber with the atmosphere. The reduction in chamber pressure likewise causes a pressure differential to be created at opening 38 between the chamber and the container, which pressure differential actuates ejection means 65 sliding ejection seal 66 upwardly on rod 67 against spring 70 to force the material out of the housing through orifice 29 and enlarged upper stem bore 28. On releasing the pressure on valve stem 25 and allowing it to return to normal position the sequence of steps is reversed, with communication between chamber 21 and the atmosphere being broken and thereafter communication being re-established between the chamber and the interior of container 12. As chamber 21 is again filled with material from the container through inlet ports 22a the pressure differential between the chamber and the container is reduced and spring 70 returns ejection seal 66 to its normal position abutting head 69 on the rod.

In order to pressure fill the container through the valve of FIG. 7, valve stem 25 is depressed sufficiently to cause head 69 on rod 70 and ejection seal 66 to pass through opening 38 at the bottom of the valve housing. In this manner material is enabled to pass into container 12 through the valve by means of enlarged bore 28, orifice 29, passage 33 and opening 38.

In FIG. 8 a modified form of the valve shown in FIG. 7 is illustrated, which is adapted to mix air with the material emanating from the valve to form a spray thereof. Basically, the structure of the metering valve of FIG. 8 is identical with that described with respect to FIG. 7, the only differences being in the structure of the valve stem, the path of travel of material entering the housing and the modified form of ejection means. Relative to the material inlet system, and as a result of the enlarged valving member 63a, the material entering through inlet port 22a is routed to the interior of chamber 21 through passages 62b and passage 33. With respect to the valve stem, it will be observed that a valve stem similar in structure to that which was described with respect to FIGS. 5 and 6 is utilized to provide an air chamber 43 and atmosphere communicating means 27a. The ejection means is formed with the ejection seal 66 fixedly mounted on a rod 67a which extends upwardly through stem 25a into air chamber 43 to function as a plunger therein. A coil spring 70, which is seated in the hollow lower end 62 of the valve stem, acts against a head 69a formed on the rod 67a for maintaining the rod and the ejection seal in extended normal position when the pressure in chamber 21 is the same as that within container 12. With respect to the operation of this form of metering valve, after the inlet ports have been valved-off and the valve chamber is communicated with the atmosphere as was previously described with respect to FIG. 7, the pressure differential between the chamber and the container created at opening 38 actuates the ejection means causing ejection seal 66 and plunger rod 67a to ride upwardly in the housing against spring 70 forcing the material out of the chamber and the air out of the air chamber 43, respectively. As was described with respect to FIGS. 5 and 6, the material and the air mix in the passage 59, between the upper end 26a of the valve stem and the cap 57, to form a spray.

Figure 9:
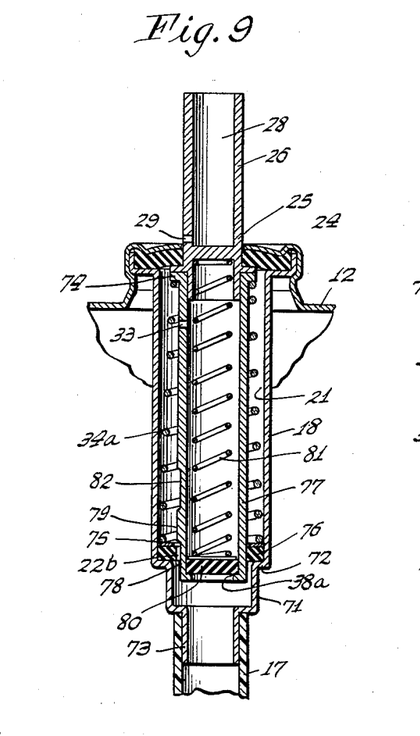
FIG. 9 is a fragmentary sectional view illustrating another form of metering valve for dispensing a material under pressure of an immiscible gas in the container.

Referring now to FIG. 9, a metering valve for dispensing materials under pressure of an immiscible gas in the container is shown wherein the valve housing 18 is formed with a lower end portion 71 of reduced diameter providing a shoulder 72 and a further reduced portion 73 adapted to telescopically engage a conventional dip tube 17. A valve stem 25, having an upper valve stem portion 26 similar to that which was described with respect to FIGS. 1 and 2, is reciprocably mounted in the valve housing so that the upper valve stem portion normally projects outwardly thereof. The valve stem is biased in normal position by a spring 34a which abuts a shoulder 74 formed on the stem and seats against an annular metal or similar washer 75 which in turn seats on an annular metal or similar washer 75 which in turn seats on an annular sealing washer 76. Inwardly of the valve housing, valve stem 25 is formed with an elongate, hollow, substantially cylindrical lower valve stem portion 77, which in the normal position of the valve stem extends through annular sealing washer 76 into reduced portion 71 of the valve housing. Lower valve stem portion 77 is formed with an elongate notch 78 in the area adjacent annular seal 76, when the valve stem is in normal position, to provide an inlet port 22b between the seal and the valve stem. It will be observed that when the valve stem is in normally disposed position material is enabled to enter chamber 21 through inlet port 22b from dip tube 17 and that on depression of the valve stem in the manner described with respect to the other forms of the invention, the notch 78 passes through annular seal 76 so that the inlet port is valved-off by the surface 79 on the stem.

In order to facilitate ejecting material from the housing outwardly thereof, an ejection means in the form of a seal 80 is slidably sealingly mounted within hollow lower valve stem portion 77 and disposed over an opening 38a therein communicating with the interior of container 12. A spring 81 within hollow stem portion 77 maintains ejection seal 80 in normally disposed position over opening 38a and a passage 33 communicates the interior of the lower stem portion with chamber 21.

In operation, valve stem 25 is displaced inwardly of valve housing 18 in the normal manner to first valve-off inlet ports 22b as afore-described and thereafter communicate chamber 21 to the atmosphere through orifice 29 and enlarged bore 28, both of which are provided in upper valve stem portion 26. After communication is established between the chamber and the atmosphere, the pressure is reduced in the chamber and a pressure differential is created at opening 38a which actuates the ejection means. The pressure differential causes ejection seal 80 to ride upwardly in hollow lower valve stem portion 77 against spring 81 to force the material outwardly of the lower stem portion and chamber 21 through orifice 29 and bore 28. On completely discharging the material from the housing, the valve stem is released and moves upwardly under the force of spring 34a to reverse the steps, first closing off the chamber to the atmosphere by carrying orifice 29 outwardly of the chamber and thereafter opening inlet port 22b by shifting notch 78 into alignment with resilient annular seal 76.

The metering valve of FIG. 9 is adapted to be pressure filled in much the same manner as were the previously described valves. In order to accomplish pressure filling, a second notch 82 is formed in the side of lower valve stem portion 77, this notch being adapted to be brought into alignment with seal 76 to form a pressure filling channel when the valve stem is displaced inwardly of the valve housing a greater distance than would be necessary for merely dispensing the material therefrom.

Figure 10:
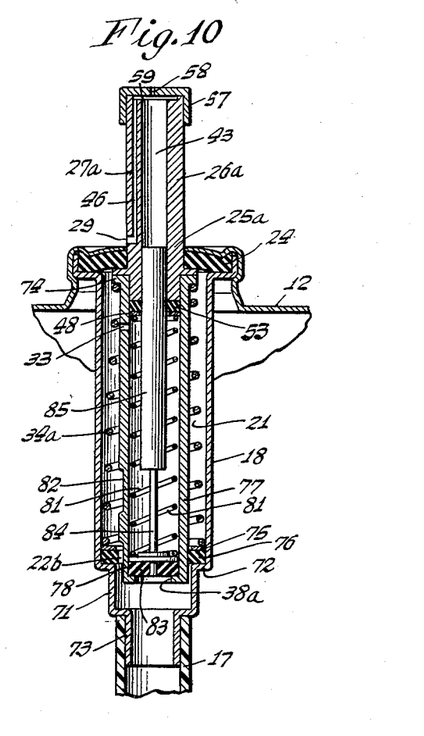
FIG. 10 is a fragmentary sectional view showing a modification of the metering valve of FIG. 9 providing means for injecting air into the material dispensed from the housing to form a spray thereof.

In FIG. 10 a modified form of the valve shown in FIG. 9 is illustrated which is adapted to mix air with the material emanating from the valve housing to form a spray thereof. According to this form of the invention a valve stem 25a, having an upper valve stem portion 26a similar to that disclosed in FIGS. 5 and 6 is reciprocably mounted in the housing. Inwardly of the housing the valve stem is similar in form to that disclosed with respect to FIG. 9, however, plunger communication between lower valve stem portion 77 and air chamber 43 in the upper valve stem portion is provided. The ejection means is shown as comprising an ejection seal 83 fixedly carried on a plunger rod 84 which has secured at its opposite end a plunger 85 adapted to be reciprocated in air chamber 43 through the opening between that chamber and lower valve stem portion 77. A spring 81, within lower valve stem portion 77, biases ejection seal 83 and the plunger rod and plunger in normal position with the seal disposed over an opening 38a in the stem communicating chamber 21 in the housing with the interior of container 12.

The operation of the valve of FIG. 10 is substantially similar to the operation of the valve of FIG. 9, but it will be understood that in addition to the ejection seal forcing the material outwardly of the housing, the upward movement of the seal with the plunger connected thereto functions to force air out of air chamber 43 so that it mixes with the material emanating from atmosphere communicating means 27a to form a spray thereof. In all other respects the valve is similar in structure and operation to the valve of FIG. 9.

Thus, among others, the several objects of the invention as aforenoted are achieved. Obviously, numerous changes in the structure may be resorted to without departing from the spirit of the invention as defined by the claims.

I claim:

1. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem cooperating with said sealing means and mounted in said housing for movement relative thereto, said stem including an upper stem portion normally projecting outwardly of said housing and having passage means therein for bypassing the sealing means and communicating said housing with the atmosphere when said stem is displaced from its normal position inwardly of said housing for dispensing material from the housing to the exterior of the container, means for closing said inlet port when said housing is communicated with said atmosphere and ejection means disposed between said housing and container and acted upon by the pressure in said container to force said material outwardly of said housing through said upper stem portion when a pressure differential is created between said housing and said container.

2. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem cooperating with said sealing means and mounted in said housing for movement relative thereto, said stem including an upper stem portion normally projecting outwardly of said housing and having passage means therein for bypassing the sealing means and communicating said housing with the atmosphere when said stem is displaced from its normal position inwardly of said housing for dispensing material from the housing to the exterior of the container, means for closing said inlet port when said housing is communicated with said atmosphere, said housing having a second port affording communication between said housing and said container, and ejection means normally disposed over said second port and actuated by pressure in said container to force said material outwardly of said housing through said upper stem portion when a pressure differential is created between said housing and said container.

3. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem sealingly mounted in said housing for movement relative thereto, said stem including an upper stem portion normally projecting outwardly of said housing and having means therein for communicating said housing with the atmosphere when said stem is displaced from its normal position inwardly of said housing, means for closing said inlet port when said housing is communicated with said atmosphere, said housing having a second port affording communication between said housing and said container, and ejection means slidably sealingly within said housing and normally disposed over said second port, said ejection means being actuated by the pressure in said container to force said material outwardly of said housing through said upper stem portion when a pressure differential is created between said housing and said container.

4. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem cooperating with said sealing means and mounted in said housing for movement relative thereto, said stem including an upper stem portion normally projecting outwardly of said housing and having passage means therein for bypassing the sealing means and communicating said housing with the atmosphere when said stem is displaced from its normal position inwardly of said housing for dispensing material from the housing to the exterior of the container, means connected to said valve stem for closing said inlet port when said housing is communicated with said atmosphere, said housing having a second port affording communication between said housing and said container, and ejection means normally disposed over said second port and actuated to force said material outwardly of said housing through said upper stem portion when a pressure differential is created between said housing and said container.

5. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem cooperating with said sealing means and mounted in said housing for movement relative thereto, said stem including an upper stem portion normally projecting outwardly of said housing and having passage means therein for bypassing said sealing means and communicating said housing with the atmosphere when said stem is displaced from its normal position inwardly of said housing for dispensing material from the housing to the exterior of the container, means for closing said inlet port when said housing is communicated with said atmosphere, said housing having a second port affording communication between said housing and said container, ejection means normally disposed over said second port and resilient means acting on said ejection means to maintain said ejection means in normally disposed position, said ejection means being actuated to move against said resilient means to force said material outwardly of said housing through said upper stem portion when a pressure differential is created between said housing and said container 6. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem sealingly mounted in said housing for movement relative thereto, said stem including an upper stem portion normally projecting outwardly of said housing and having means therein for communicating said housing with the atmosphere when said stem is displaced from its normal position inwardly of said housing, means for closing said inlet port when said housing is communicated with said atmosphere, said housing having a second port affording communication between said housing and said container, ejection means disposed in said housing over said second port and adapted to sealingly reduce the volume of said housing when said housing is communicated with the atmosphere, and resilient means maintaining said ejection means over said second port, said ejection means being actuated to move against said resilient means to reduce the volume of said housing to force said material outwardly of said housing through said upper stem portion when a pressure differential is created between said housing and said container.

7. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem sealingly mounted in said housing for movement relative thereto, said stem including an upper stem portion normally projecting outwardly of said housing and having means therein for communicating said housing with the atmosphere when said stem is displaced from its normal position inwardly of said housing, said housing having a second port affording communication between said housing and said container and ejection means normally disposed over said second port and actuated to close said inlet port and force said material outwardly of said housing through said upper stem portion when a pressure differential is created between said housing and said container.

8. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem sealingly mounted in said housing for movement relative thereto, said stem including an upper stem portion normally projecting outwardly of said housing and having means therein for communicating said housing with the atmosphere when said stem is displaced from its normal position inwardly of said housing, means for closing said inlet port when said housing is communicated with said atmosphere, said housing having a second port affording communication between said housing and said container, and ejection means movably carried by said valve stem and normally disposed over said second port, said ejection means being actuated to force said material outwardly of said housing through said upper stem portion when a pressure differential is created between said housing and said container.

9. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a substantially tubular reciprocable valve stem sealingly mounted in said housing for movement relative thereto, said stem including an upper stem portion normally projecting outwardly of said housing and having means therein for communicating said housing with the atmosphere when said stem is displaced from its normal position inwardly of said housing, means for closing said inlet port when said housing is communicated with said atmosphere, said housing having a second port affording communication between said housing and said container, and ejection means slidably carried within said valve stem and cooperating with said stem for closing said second port when said stem is displaced from its normal position, said ejection means being actuated to force said material outwardly of said housing through said upper stem portion when a pressure differential is created between said housing and said container.

10. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem cooperating with said sealing means and mounted in said housing for movement relative thereto, said stem including an upper stem portion normally projecting outwardly of said housing and having passage means therein for bypassing said sealing means and communicating said housing with the atmosphere when said stem is displaced from its normal position inwardly of said housing for dispensing material from the housing to the exterior of the container, means for closing said inlet port when said housing is communicated with said atmosphere, said housing having a second port affording communication between said housing and said container, and ejection means operably connected to said valve stem and normally disposed over said second port, said ejection means being actuated to force said material outwardly of said housing through said upper stem portion when a pressure differential is created between said housing and said container.

11. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem sealingly mounted in said housing for movement relative thereto, said stem including an upper stem portion normally projecting outwardly of said housing and having means therein for communicating said housing with the atmosphere when said stem is displaced from its normal position inwardly of said housing, means for closing said inlet port when said housing is communicated with said atmosphere, said housing having a second port affording communication between said housing and said container, ejection means operably connected to said valve stem for movement toward and away therefrom and normally disposed over said second port, and resilient means biasing said ejection means away from said valve stem, said ejection means being actuated to move against said resilient means to force said material outwardly of said housing through said upper stem portion when a pressure differential is created between said housing and said container.

12. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable substantially tubular valve stem sealingly mounted in said housing for movement relative thereto, said stem including an upper stem portion normally projecting outwardly of said housing and having means therein for communicating said housing with the atmosphere when said stem is displaced from its normal position inwardly of said housing, means for closing said inlet port when said housing is communicated with said atmosphere, said housing having a second port affording communication between said housing and said container, ejection means telescopically connected to said valve stem for movement relative thereto, and resilient means maintaining said ejection means in extended position relative said valve stem and disposed over said second port, said ejection means being actuated to move against said resilient means to force said material outwardly of said housing through said upper stem portion in spray form when a pressure differential is created between said housing and said container.

13. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a substantially tubular reciprocable valve stem sealingly mounted in said housing for movement relative thereto, said stem including an upper stem portion normally projecting outwardly of said housing and having outlet means therein for communicating said housing with the atmosphere when said stem is displaced from its normal position inwardly of said housing and means communicating the bore of said stem with the atmosphere substantially adjacent said outlet means, means for closing said inlet port when said housing is communicated with said atmosphere, said housing having a second port affording communication between said housing and said container, ejection means telescopically connected to said valve stem for movement relative thereto, and resilient means maintaining said ejection means in extended position relative said valve stem and disposed over said second port, said ejection means being actuated to move against said resilient means to force said material outwardly of said housing through said outlet means in said upper stem portion and to force air outwardly of said bore to mix with said material emanating from said outlet means when a pressure differential is created between said housing and said container.

14. A metering valve for dispensing a material from a container under pressure of an immiscible gas in said container comprising a valve housing for holding a predetermined quantity of said material, means for mounting said housing on said container, said housing having an inlet port for communicating said housing with said container and sealing means for sealing said housing from the atmosphere, a reciprocable valve stem sealingly mounted in said housing for movement relative thereto, said stem including a substantially tubular upper stem portion normally projecting outwardly of said housing and having outlet means therein for communicating said housing with the atmosphere when said stem is displaced from its normal position inwardly of said housing and means communicating the bore of said tubular upper portion to the atmosphere adjacent said outlet means, means for closing said inlet port when said housing is communicated with said atmosphere, said housing having a second port affording communication between said housing and said container, ejection means operably connected to said valve stem for movement relative thereto including a plunger slidably within the bore of said tubular upper stem portion, and resilient means maintaining said ejection means in extended position relative said valve stem and disposed over said second port, said ejection means being actuated to move against said resilient means to force said material outwardly of said housing through said outlet means in said upper stem portion and to force the air in said bore outwardly thereof to mix with said material and form a spray when a pressure differential is created between said housing and said container.

15. In a metering valve for dispensing material from a container including a valve housing for holding a predetermined quantity of said material, means for mounting said housing on said container, said housing having an inlet port for communicating said housing with said container and sealing means for sealing said housing from the atmosphere, a reciprocable valve stem cooperating with said sealing means and mounted by said housing for movement relative thereto, said stem including an upper stem portion normally projecting outwardly of said housing and having passage means therein for bypassing the sealing means and communicating said housing with the atmosphere when said stem is displaced from its normal position inwardly of said housing for dispensing material from the housing to the exterior of the container and means for closing said inlet port when said housing is communicated with the atmosphere; the improvement in metering valves facilitating dispensing a material under pressure of an immiscible gas in said container comprising ejection means disposed between said housing and container and acted upon by the pressure in said container to force said material outwardly of said housing through said upper stem portion when a pressure differential is created between said housing and said container.

16. In a metering valve for dispensing material from a container including a valve housing for holding a predetermined quantity of said material, means for mounting said housing on said container, said housing having an inlet port for communicating said housing with said container and sealing means, for sealing said housing from the atmosphere, a reciprocable valve stem cooperating with said sealing means and mounted by said housing for movement relative thereto, said stem including an upper stem portion normally projecting outwardly of said housing and having passage means therein for bypassing the sealing means and communicating said housing with the atmosphere when said stem is displaced from its normal position inwardly of said housing for dispensing material from the housing to the exterior of the container and means for closing said inlet port when said housing is communicated with the atmosphere; the improvement in metering valves facilitating dispensing a material under pressure of an immiscible gas in said container comprising means forming a second port in said housing affording communication between said housing and said container, ejection means normally disposed over said second port and actuated by pressure in said container to force said material outwardly of said housing through said upper stem portion when a pressure differential is created between said housing and said container.

17. In a metering valve for dispensing material from a container including a valve housing for holding a predetermined quantity of said material, means for mounting said housing on said container, said housing having an inlet port for communicating said housing with said container and sealing means for sealing said housing from the atmosphere, a reciprocable valve stem sealingly mounted by said housing for movement relative thereto, said stem including an upper stem portion normally projecting outwardly of said housing and having means therein for communicating said housing with the atmosphere when said stem is displaced from its normal position inwardly of said housing and means for closing said inlet port when said housing is communicated with the atmosphere; the improvement in metering valves facilitating dispensing a material under pressure of an immiscible gas in said container in spray form comprising means forming a second port in said housing affording communication between said housing and said container, ejection means operably connected to said valve stem and disposed over said second port, said ejection means being actuated by pressure in said container to force said material outwardly of said housing through said upper stem portion when a pressure differential is created between said housing and said container and means forming part of said ejection means for forcing air out of a chamber forming part of said upper stem portion to mix with said material as said material is dispensed from said upper stem portion.

18. A metering valve for dispensing a material from a container under pressure of an immiscible gas in said container comprising a valve housing for holding a predetermined quantity of said material, means for mounting said housing on said container, means for sealing said housing from the atmosphere, a reciprocable substantially tubular valve stem sealingly mounted in said housing for movement relative thereto, said stem including an upper stem portion normally projecting outwardly of said housing and having means therein for communicating said housing with the atmosphere when said stem is displaced from its normal position inwardly of said housing, said housing and said reciprocable valve stem cooperating to form an inlet port for communicating said housing with said container, means for closing said inlet port when said housing is communicated with said atmosphere, said housing having a second port affording communication between said housing and said container, ejection means telescopically connected to said valve stem for movement relative thereto, and resilient means maintaining said ejection means in extended position relative said valve stem and disposed over said second port, said ejection means being actuated to move against said resilient means to force said material outwardly of said housing through said upper stem portion when a pressure differential is created between said housing and said container.

19. The invention as defined in claim 18 wherein there is means mounting said tubular valve stem for movement to a position in which said means for closing said inlet port is disposed below said inlet port thereby establishing direct communication between said upper stem portion and the interior of the container.

20. A metering valve for dispensing a material from a container under pressure of an immiscible gas in said container comprising a valve housing for holding a predetermined quantity of said material, means for mounting said housing on said container, means for sealing said housing from the atmosphere, a substantially tubular reciprocable valve stem sealingly mounted in said housing for movement relative thereto, said stem including an upper stem portion normally projecting outwardly of said housing and having outlet means therein for communicating said housing with the atmosphere when said stem is displaced from its normal position inwardly of said housing and means communicating the bore of said stem with the atmosphere substantially adjacent said outlet means, said housing and said reciprocable valve stem cooperating to form an inlet port for communicating said housing with said container, means for closing said inlet port when said housing is communicated with said atmosphere, said housing having a second port affording communication between said housing and said container, ejection means telescopically connected to said valve stem for movement relative thereto, and resilient means maintaining said ejection means in extended position relative said valve stem and disposed over said second port, said ejection means being actuated to move against said resilient means to force said material outwardly of said housing through said outlet means in said upper stem portion and to force air outwardly of said bore to mix with said material emanating from said outlet means when a pressure differential is created between said housing and said container.

21. The invention as defined in claim 20 wherein there is means mounting said tubular valve stem for movement to a position wherein the means for closing the inlet port is disposed below the inlet port thereby establishing direct communication between the outlet means in the stem and the inlet port.

References Cited in the file of this patent
UNITED STATES PATENTS

| | | |
|---|---|---|
| 1,748,248 | Shepherd | Feb. 25, 1930 |
| 1,870,188 | Abrams | Aug. 2, 1932 |
| 2,688,514 | Oishei et al. | Sept. 7, 1954 |
| 2,772,814 | Meyers | Dec. 4, 1956 |
| 2,783,920 | Negoro | Mar. 5, 1957 |
| 2,802,490 | Ward | Aug. 13, 1957 |
| 2,812,884 | Ward | Nov. 12, 1957 |
| 2,837,249 | Meshberg | June 3, 1958 |